US007245981B2

(12) United States Patent
Dick et al.

(10) Patent No.: US 7,245,981 B2
(45) Date of Patent: Jul. 17, 2007

(54) MATERIAL HANDLING SYSTEM WITH SAW AND WHEEL DRAG MECHANISM

(75) Inventors: Spencer B. Dick, Portland, OR (US); Stuart Aldrich, Portland, OR (US); David A. Morgan, Portland, OR (US)

(73) Assignee: Precision Automation, Inc., Vancouver, WA (US)

( * ) Notice: Subject to any disclaimer, the term of this patent is extended or adjusted under 35 U.S.C. 154(b) by 84 days.

(21) Appl. No.: 11/140,541

(22) Filed: May 26, 2005

(65) Prior Publication Data

US 2006/0004478 A1 Jan. 5, 2006

Related U.S. Application Data

(60) Provisional application No. 60/574,863, filed on May 26, 2004.

(51) Int. Cl.
*G06F 19/00* (2006.01)

(52) U.S. Cl. ...................... 700/167; 700/170; 700/171; 144/352; 144/356; 83/72; 83/78

(58) Field of Classification Search ................ 700/167, 700/170, 171; 144/352, 356, 344; 408/10; 83/72, 78

See application file for complete search history.

(56) References Cited

U.S. PATENT DOCUMENTS

| | | | | |
|---|---|---|---|---|
| 491,307 | A | | 2/1893 | Gaylord |
| 1,271,473 | A | | 7/1918 | Johnson |
| 2,315,458 | A | | 3/1943 | Sellmeyer |
| 2,577,766 | A | | 12/1951 | Johnson et al. |
| 2,602,477 | A | | 7/1952 | Kniff |
| 2,731,989 | A | | 1/1956 | Valcourt et al. |
| 2,740,437 | A | | 4/1956 | Odlum et al. |
| 2,852,049 | A | | 9/1958 | Peterson |
| 3,170,736 | A | | 2/1965 | Wright |
| 3,186,453 | A | | 6/1965 | Green |
| 3,329,181 | A | | 7/1967 | Buss et al. |
| 3,459,246 | A | | 8/1969 | Ottoson |
| 3,584,284 | A | | 6/1971 | Beach |
| 3,566,239 | A | | 7/1971 | Taniguchi |
| 3,730,042 | A | * | 5/1973 | Price ......................... 83/471.3 |
| 3,736,968 | A | | 6/1973 | Mason |
| 3,738,403 | A | | 6/1973 | Schwoch |
| 3,780,777 | A | | 12/1973 | Davies |
| 3,811,353 | A | | 5/1974 | Miles |
| 3,814,153 | A | | 6/1974 | Schmidt |
| 3,841,462 | A | | 11/1974 | Schmidt |
| 3,854,889 | A | | 12/1974 | Lemelson |
| 3,886,372 | A | | 5/1975 | Sanglert |
| 3,917,078 | A | | 11/1975 | Schmidt |
| 3,941,019 | A | | 3/1976 | Baldwin et al. |
| 3,994,484 | A | | 11/1976 | Schorr |
| 4,055,097 | A | | 10/1977 | Ducret |
| 4,111,088 | A | | 9/1978 | Ziegelmeyer |
| 4,144,449 | A | | 3/1979 | Funk et al. |
| 4,221,974 | A | | 9/1980 | Mueller et al. |
| 4,260,001 | A | | 4/1981 | De Muynck |
| 4,286,880 | A | | 9/1981 | Young |

(Continued)

*Primary Examiner*—Michael D. Masinick
(74) *Attorney, Agent, or Firm*—Kolisch Hartwell, P.C.

(57) ABSTRACT

A material handling system with a drag mechanism including a wheel for a table saw that controls the orientation and speed of material as it moves through the system.

19 Claims, 3 Drawing Sheets

U.S. PATENT DOCUMENTS

| | | | |
|---|---|---|---|
| 4,358,166 | A | 11/1982 | Antoine |
| 4,410,025 | A | 10/1983 | Sicotte |
| 4,434,693 | A | 3/1984 | Hosoi |
| 4,453,838 | A | 6/1984 | Loizeau |
| 4,454,794 | A | 6/1984 | Thornton |
| 4,469,318 | A | 9/1984 | Slavic |
| 4,472,783 | A | 9/1984 | Johnstone et al. |
| 4,499,933 | A | 2/1985 | Thompson |
| 4,541,722 | A | 9/1985 | Jenks |
| 4,596,172 | A | 6/1986 | Visser |
| 4,658,687 | A | 4/1987 | Haas et al. |
| 4,694,871 | A | 9/1987 | Jenkner |
| 4,725,961 | A | 2/1988 | Pearl |
| 4,736,511 | A | 4/1988 | Jenkner |
| 4,791,757 | A | 12/1988 | Orlando |
| 4,805,505 | A | 2/1989 | Cantlin |
| 4,830,075 | A | 5/1989 | Jenkner |
| 4,874,996 | A | 10/1989 | Rosenthal |
| 4,878,524 | A | 11/1989 | Rosenthal et al. |
| 4,879,752 | A | 11/1989 | Aune et al. |
| 4,901,992 | A | 2/1990 | Dobeck |
| 4,939,739 | A | 7/1990 | Hobart et al. |
| 4,949,605 | A * | 8/1990 | Geller et al. .................. 82/46 |
| 5,001,955 | A | 3/1991 | Fujiwara |
| 5,042,341 | A | 8/1991 | Greten et al. |
| 5,054,938 | A | 10/1991 | Ide |
| 5,058,474 | A | 10/1991 | Herrera |
| 5,094,282 | A | 3/1992 | Suzuki et al. |
| 5,142,158 | A | 8/1992 | Craig, Jr. |
| 5,176,060 | A | 1/1993 | Thornton |
| 5,197,172 | A | 3/1993 | Takagi et al. |
| 5,201,258 | A | 4/1993 | Cremona |
| 5,201,351 | A | 4/1993 | Hurdle, Jr. |
| 5,251,142 | A | 10/1993 | Cramer |
| 5,254,859 | A | 10/1993 | Carman et al. |
| 5,365,812 | A | 11/1994 | Harnden |
| 5,418,729 | A | 5/1995 | Holmes et al. |
| 5,443,554 | A | 8/1995 | Robert |
| 5,444,635 | A | 8/1995 | Blaine et al. |
| 5,460,070 | A | 10/1995 | Buskness |
| 5,472,028 | A | 12/1995 | Faulhaber |
| 5,489,155 | A | 2/1996 | Ide |
| 5,524,514 | A | 6/1996 | Hadaway et al. |
| 5,663,882 | A | 9/1997 | Douglas |
| 5,664,888 | A | 9/1997 | Sabin |
| RE35,663 | E | 11/1997 | Mori et al. |
| 5,772,192 | A | 6/1998 | Hoffmann |
| 5,797,685 | A | 8/1998 | Jurik et al. |
| 5,798,929 | A | 8/1998 | Stenzel et al. |
| 5,829,892 | A | 11/1998 | Groves |
| 5,865,080 | A | 2/1999 | Jackson |
| 5,933,353 | A | 8/1999 | Abriam et al. |
| 5,938,344 | A | 8/1999 | Sabin |
| 5,953,232 | A | 9/1999 | Blaimschein |
| 5,960,104 | A | 9/1999 | Conners et al. |
| 5,964,536 | A | 10/1999 | Kinoshita |
| 6,058,589 | A | 5/2000 | Hakansson |
| 6,062,280 | A | 5/2000 | Newnes et al. |
| 6,120,628 | A | 9/2000 | Pritelli |
| 6,144,895 | A | 11/2000 | Govindaraj et al. |
| 6,216,574 | B1 | 4/2001 | Hain |
| 6,244,149 | B1 * | 6/2001 | Ceroll et al. ............... 83/477.2 |
| 6,263,773 | B1 | 7/2001 | McAdoo et al. |
| 6,272,437 | B1 | 8/2001 | Woods et al. |
| 6,314,379 | B1 | 11/2001 | Hu et al. |
| 6,379,048 | B1 | 4/2002 | Brissette |
| 6,390,159 | B1 | 5/2002 | Pinske |
| 6,422,111 | B1 | 7/2002 | Rousseau |
| 6,463,352 | B1 | 10/2002 | Tadokoro et al. |
| 6,470,377 | B1 | 10/2002 | Sevcik et al. |
| 6,510,361 | B1 | 1/2003 | Govindaraj et al. |
| 6,520,228 | B1 * | 2/2003 | Hannebauer et al. ....... 144/398 |
| 6,549,438 | B2 | 4/2003 | Malone |
| 6,594,590 | B2 | 7/2003 | Woods et al. |
| 6,618,692 | B2 | 9/2003 | Takahashi et al. |
| 6,631,006 | B2 | 10/2003 | Dick et al. |
| 6,675,685 | B2 | 1/2004 | Ceroll et al. |
| 6,690,990 | B1 | 2/2004 | Caron et al. |
| 6,701,259 | B2 | 3/2004 | Dor et al. |
| 6,735,493 | B1 | 5/2004 | Chou et al. |
| 6,764,434 | B1 | 7/2004 | Volk |
| 6,886,462 | B2 | 5/2005 | Dick et al. |
| 6,898,478 | B2 * | 5/2005 | Dick et al. .................. 700/171 |
| 2004/0027038 | A1 | 2/2004 | Gaesser et al. |
| 2005/0098004 | A1 | 5/2005 | Dick et al. |

* cited by examiner

MATERIAL HANDLING SYSTEM WITH SAW AND WHEEL DRAG MECHANISM

CROSS-REFERENCE TO RELATED APPLICATIONS

This application claims priority under 35 U.S.C. § 119 and applicable foreign and international law of U.S. Provisional Patent Application Ser. No. 60/574,863 filed May 26, 2004, which is hereby incorporated by reference.

This application incorporates by reference in its entirety the following patent applications and patents: U.S. patent application Ser. No. 09/578,806 filed May 24, 2000 entitled "Automated Fence Control Coupling System"; U.S. patent application Ser. No. 09/861,231 filed May 17, 2001 entitled "System and Method of Marking Materials for Automated Processing"; U.S. patent application Ser. No. 10/104,492 filed Mar. 22, 2002 entitled "Automated Fence Control Coupling System"; U.S. patent application Ser. No. 60/405,068 filed Aug. 20, 2002 entitled "Process Management System and Method"; PCT Application No. PCT/US2003/26185 filed Aug. 20, 2003 entitled "Apparatus and Method of Processing Materials"; PCT Patent Application No. PCT/US2003/26186 filed Aug. 20, 2003 entitled "Systems and Methods for Automated Material Processing"; U.S. patent application Ser. No. 10/642,349 filed Aug. 15, 2003 entitled "Linkage Device for Linear Positioning Apparatus"; U.S. patent application Ser. No. 10/645,865 filed Aug. 20, 2003 entitled "Systems and Methods for Automated Material Processing" and U.S. Pat. Nos. 491,307; 2,315,458; 2,731,989; 2,740,437; 2,852,049; 3,994,484; 4,111,088; 4,434,693; 4,658,687; 4,791,757; 4,805,505; 4,901,992; 5,251,142; 5,443,554; 5,444,635; 5,460,070; 5,524,514; and 6,216,574.

FIELD

The invention relates to devices for controlling the position of materials as they are moved through processing equipment, such as a saw.

BACKGROUND

Material handling and processing systems employ pushing devices for moving materials through processing equipment, such as a saw. In some material handling systems, it may be advantageous to provide a return conveyor so that once pieces are processed, they return to the operator for sorting. One problem with some return conveyor devices is that pieces of material are not transferred smoothly to the return conveyor and consequently reach the operator in an unpredictable orientation. Other return systems are undesirable because they require complicated electronic and/or mechanical equipment.

Another problem with some material handling systems is that they tend to push pieces beyond the target processing location if operated too quickly. If a pusher moves at too high of a speed, then the piece of material may float beyond the target processing location. Even small amounts of float may cause significant inaccuracies in dimension and waste. This problem may significantly limit a productivity and/or manufacturing efficiency.

SUMMARY

Automated material handling and positioning systems control the orientation and speed of material as the material is moved through the system. An example of such a system includes idler mechanism that maintains the orientation of a piece of processed material as it moves away from a processing device, such as a saw. Another example uses a drag mechanism to assist in controlling the speed and orientation of the material as it moves toward the processing device.

DESCRIPTION OF EXAMPLES OF THE INVENTION

Figure 1:
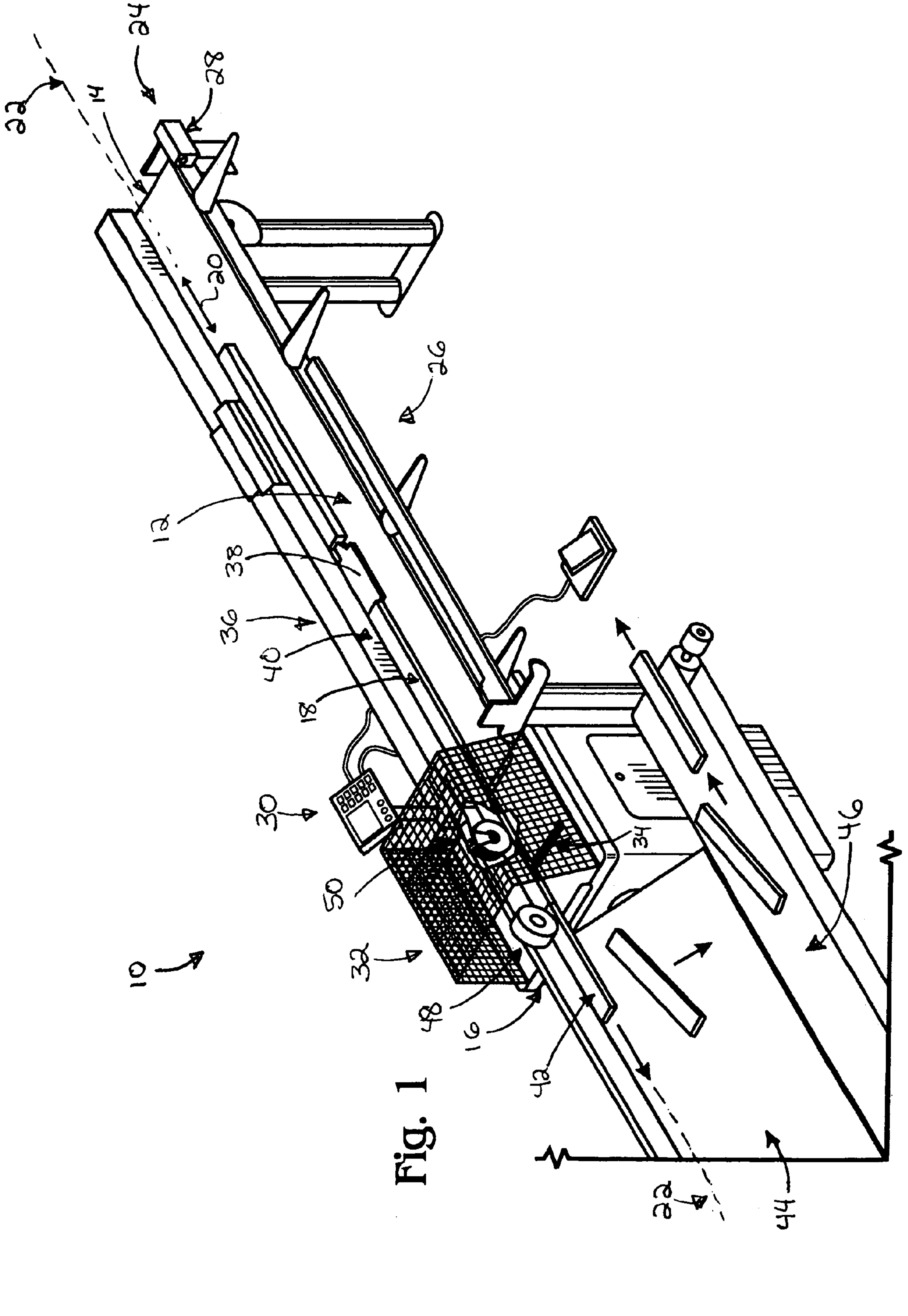
FIG. 1 is a schematic view of an exemplary material handling system including an idler mechanism and a drag mechanism according to the present invention.

An example of a material handling and automated processing system constructed in accordance with the present invention is shown generally at 10 in FIG. 1. System 10 may include a table portion or platform 12 having an input end 14 and an output end 16. An article or material 18 such as a piece of wood may be moved from input end 14 to output end 16 along a processing path 20. In a linear system, as shown in FIG. 1, this movement defines a processing axis 22. The article may be a piece of wood, metal, plastic, ceramic, or other material. The article may have any suitable shape and size, and may be elongate to define a long axis, which may correspond to processing axis 22.

As shown in FIG. 1, system 10 may include a marking assembly 24 positioned along a front portion of the system. Marking assembly 24 may include a marking station 26 to orient the material relative to an optical measuring device 28. As material 18 travels along processing axis 22, feature locations in the material may be input by a user to the optical measuring device 28, which communicates the feature locations to an optimizer or controller 30. Another computer (not shown) may be used remotely from controller 30 to store, edit, combine, or modify processing lists, such as cut lists, prior to downloading one or more lists to controller 30. Marking assembly 24 allows a user to virtually mark the feature locations of material 18 along processing axis 22 of the material. A "virtual mark" means a noted location on a material relative to a registration point such as an end of the material or an axis, without requiring an actual physical mark on the material. An example of marking assembly 24 is described in U.S. Pat. No. 6,631,006. Controller 30 may use one or more structural aspects of the material, such as feature locations and/or overall length, among others, to determine processing sites. Structural aspects may include dimensions, defect locations, grade of material, etc. One or more structural aspects may be input optically and/or with another user interface.

System 10 further includes a processing station 32 that may be configured to process the material automatically based on the optically input data. Material processing, as used herein, may include any structural alteration of an article. The structural alteration may include removing or separating a portion of the article (such as by cutting, boring, punching, routing, mortising, sanding, drilling, shearing, etc.), adding another component (such as a fastener, a colorant, a sealing agent, a connected component, etc.), forming a joint (such as by tenoning), reshaping the article (such as by stamping, compression, bending, etc.), and/or altering the strength of the article (such as by heating, electromagnetic radiation exposure, radiation treatment, etc.), among others. Processing station 32 includes a processing device 34. In the example shown in FIG. 1, processing device 34 takes the form of a table saw.

Station 32 may include a positioner assembly 36, which may position previously-marked material, relative to a material processing device, such as a saw. Positioned material may be processed at one or more discrete positions along processing axis 22 by processing device 34. Material processing may be based on virtually-marked feature locations or other processing data supplied by the user, or may be in accordance with a processing list, such as a cut list, which may be stored in or otherwise accessible to controller 30.

In some embodiments, a material feeding or pusher mechanism 38 may be employed within positioner assembly 36 to engage an end of the material and push the material relative to the processing station, particularly relative to a material processing device of the processing station. As shown, pusher mechanism 38 operates to push pieces of material from input end 14 towards output end 16 along processing path 20 for in-line processing of the material or article. Accordingly, the material may be processed at one position or a plurality of discrete positions arranged along the processing path.

Positioner assembly 36 may include a fence structure 40 to index a piece of material for processing by processing device 34, such as a saw. Pusher 38 may slide along table portion 12 to move material 18 along the processing path parallel to fence 40.

Processed material 42 exits processing station 32 through output end 16 after being cut or otherwise processed. A ramp 44 is provided to deliver processed material 42 to a return conveyor 46. The return conveyor is configured to transport a piece of processed material in a direction opposite from the direction that the material is transported along the processing path. By returning pieces of processed material on conveyor 46, an operator is able to sort the material as it is processed.

As processed material 42 is urged out of the processing station, the processed material may fall unpredictably down ramp 44. The end of a piece of processed material closest to the processing device, such as a saw, may be pushed backwards into the saw or the saw cabinet when the end of the processed material furthest from the saw contacts the ramp or conveyor. To reduce this backward movement, table portion 12 may extend past the saw a length at least half as long as the longest dimension cut on system 10; however, even if table portion 12 is sufficiently long, the piece of processed material may tend to fall in an unpredictably skewed orientation.

As will subsequently be discussed, an idler mechanism 48 may be included in processing station 32 for stabilizing processed material 42 prior to the material sliding down ramp 44. Idler mechanism 48 may maintain a piece of processed material in the processing path until substantially the entire length of the processed material moves sufficiently far away from processing device 34. The idler mechanism thus allows a piece of processed material to be outfed without falling onto the sloped surface of ramp 44 in an unpredictable or skewed fashion. This allows for a shorter outfeed system and an inexpensive and compact return conveyor system.

Also shown in FIG. 1 is the inclusion in processing station 32 of a drag mechanism 50 that permits pusher mechanism 38 to operate at high speeds. Pusher 38 is limited in its operating speed by the amount of drag produced by friction between material 18 and table portion 12. If pusher 38 urges the material towards the processing device 34 too quickly, the material may move beyond the target processing location. Slowing down the pusher to reduce this problem results in decreased productivity. To reduce the likelihood of the material moving too far along the processing path, drag mechanism 50 exerts a drag force on material 18 as it is pushed from the input end towards the output end, the details of which are described below.

Figure 2:
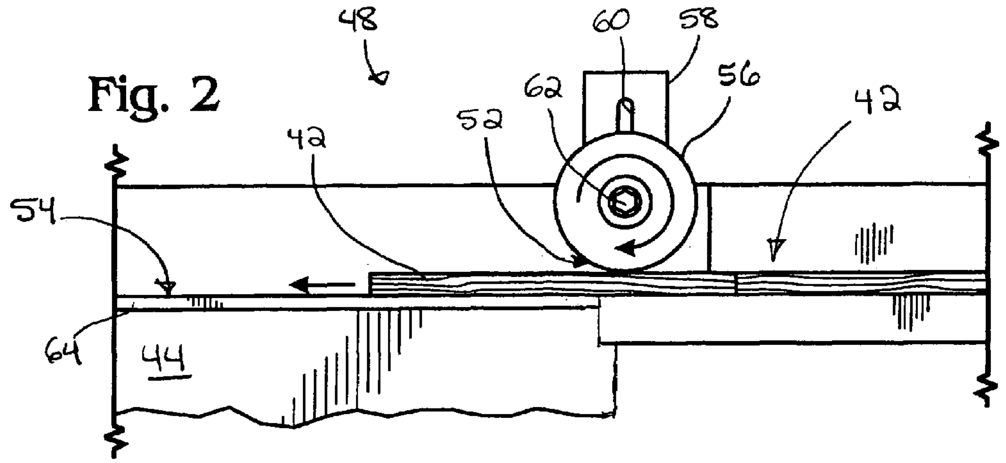
FIG. 2 is a side view of the idler mechanism of FIG. 1.
Figure 3:
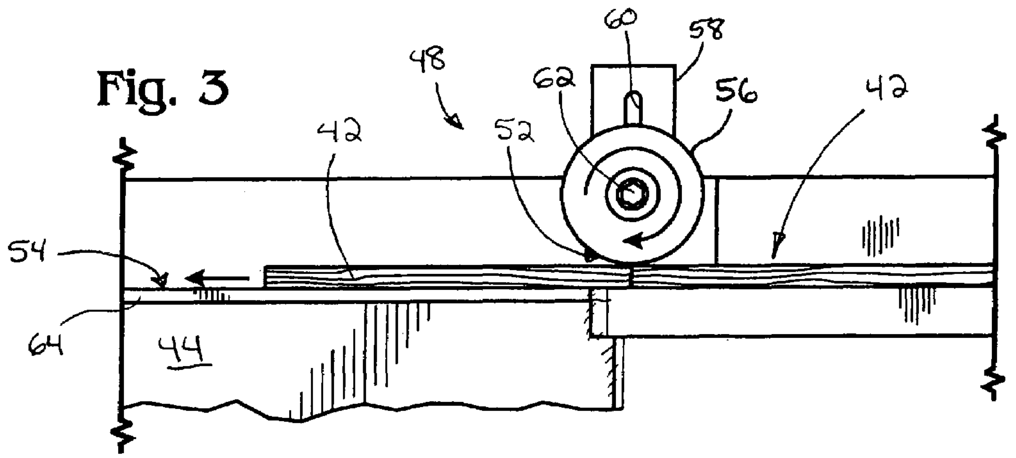
FIG. 3 is a side view of the idler mechanism of FIG. 2 showing support of a piece of processed material along a processing path.
Figure 4:
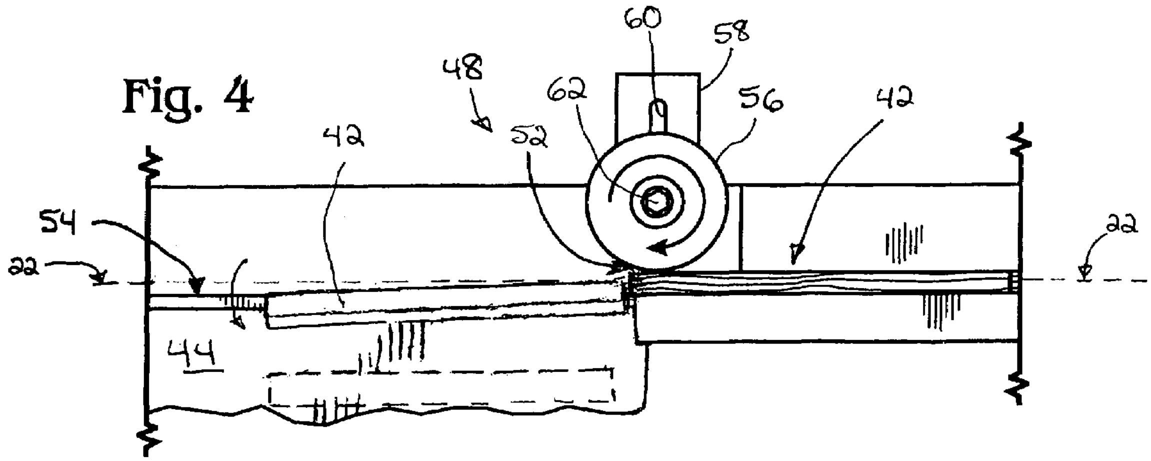
FIG. 4 is a side view of the idler mechanism of FIG. 3 showing release of the piece of processed material onto a ramp.

Idler mechanism 48 is shown in detail in FIGS. 2 through 4. As shown, idler mechanism 48 includes an upper support surface 52 that supports an upper surface of processed material 42 and a lower support surface 54 that supports a lower surface of processed material 42. Upper support surface 52 operates in conjunction with lower support surface 54 to straddle and thereby stabilize a piece of processed material 42 parallel to an edge of ramp 44 until the processed material moves off of table portion 12. Upper support surface 52 is substantially aligned with output end 16. The upper support surface may apply a force to an upper surface of the processed material. Once processed material 42 reaches the output end of table portion 12, the processed material is free to rotate onto ramp 44 so that the processed material slides down the ramp in an orientation parallel to that of the processing path.

As illustrated, idler mechanism 48 is located adjacent output end 16 and configured to maintain processed 42 material in processing path 20 until substantially the entire length of the processed material moves beyond upper support surface 52. The upper support surface and the lower support surface are offset from one another along processing path 20 and contact opposing sides of processed material 42. The support surfaces are configured to restrict rotation of the processed material until the processed material moves past upper support surface 52 and is supported above the ramp by lower support surface 54. The lower support surface may support an edge of the processed material, leaving the opposing edge free to contact ramp 44 when the processed piece is released by the idler mechanism. Lower support surface 54 may be substantially coplanar with a top surface of table portion 12 for at least partially supporting the processed material until the processed material moves beyond the upper support surface. Thus, lower support surface 54 is configured to facilitate smooth movement of processed material 42 from table portion 12 onto lower support surface 54.

As depicted in the exemplary idler mechanism of FIGS. 2 through 4, the upper support surface may take the form of a roller 56. Roller 56 may freely rotate in the direction the material is being pushed. For example, in the linear processing system depicted, roller 56 rotates about an axis substantially perpendicular to processing axis 22.

Roller 56 may be mounted to processing station 32 via a bracket 58. The bracket may include an aperture or groove 60 in which roller 56 may travel. Roller 56 may therefore be vertically adjustable via fastener 62, such as a bolt, to accommodate different thicknesses of processed material 42 or to adjust the amount of pressure exerted by roller 56 on the work piece. Fastener 62 may be manually adjustable or may be automatically adjustable, such as with springs, to allow vertical adjustment of roller 56 as a piece of processed material 42 slides under the roller, while still allowing roller 56 to press against the processed material by applying a vertical force on a top surface of the processed material.

As shown, roller 56 may be aligned with output end 16 such that as the processed material moves past the roller, the processed material moves off of table portion 12 at substantially the same time. Rotation of processed material 42 is thereby restricted until the processed material has moved sufficiently far away from processing device 34.

Lower support surface 54 may take the form of a ridge or narrow plateau 64. The ridge may be level with a top surface of the table portion. As illustrated in FIGS. 2 and 3, a piece of processed material 42 may slide under roller 56 and across ridge 64 so that it is continuously supported along its length. The processed material may therefore be temporarily sandwiched between the roller and the ridge as the processed material moves along the processing axis. As illustrated in FIG. 4, once processed material 42 has moved past roller 56, processed material 42 is free to rotate about processing axis 22 onto ramp 44, as depicted in FIG. 4.

It should be appreciated that the configuration shown is one of many possible variations of idler mechanism 48. The upper and lower support surfaces may be any suitable smooth surfaces that allow movement along the processing path, yet restrict rotation of the processed material until the processed material has moved sufficiently far away from processing device 34. Upper support surface 52 and lower support surface 54 may be laterally offset from one another along the processing path or may at least partially overlap one another. In some embodiments, upper support surface 52 may be substantially aligned with the output end of the table portion so that processed material 42 is no longer in contact with the table portion once the processed material has moved past the upper support surface.

Figure 5:
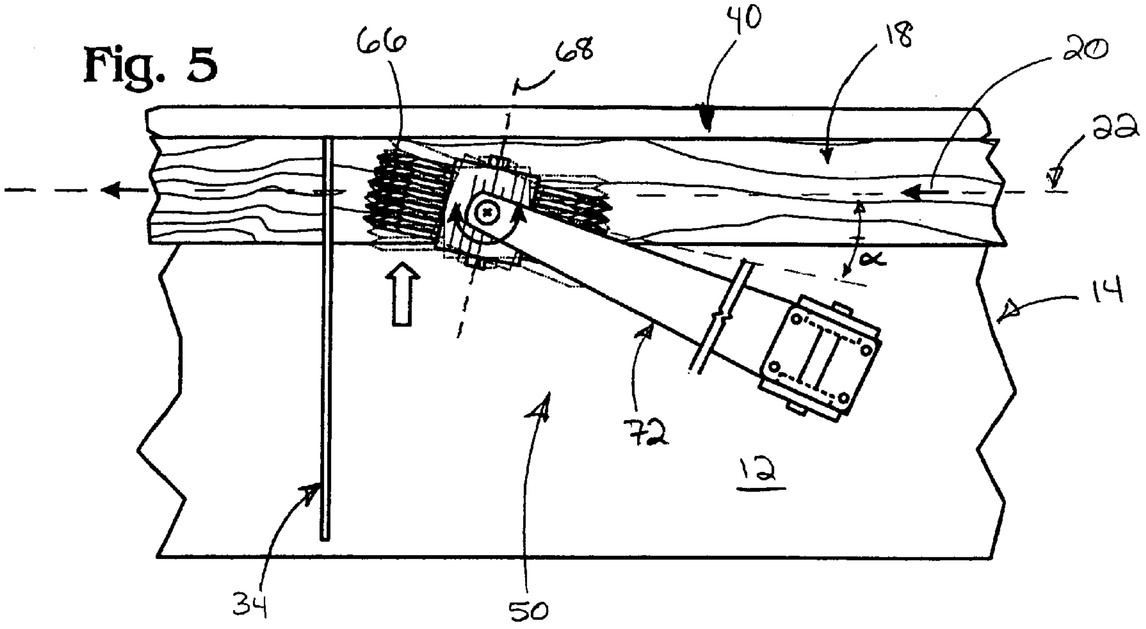
FIG. 5 is a top view of the exemplary drag mechanism of FIG. 1 illustrating adjustment of a drag wheel relative to a processing path or axis.
Figure 6:
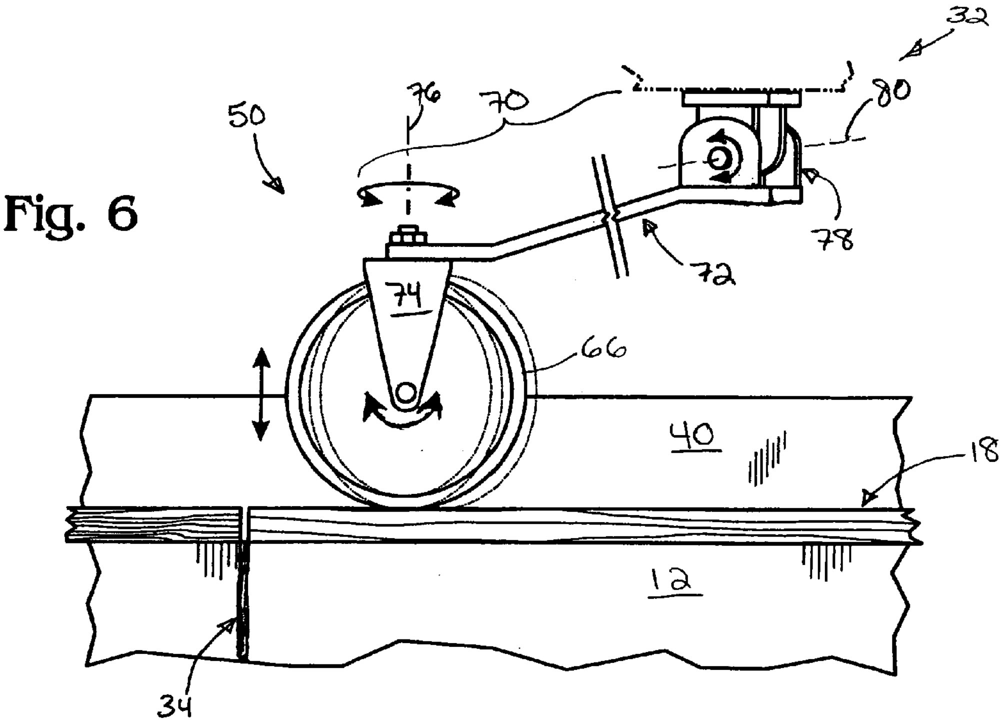
FIG. 6 is a side view of the exemplary drag mechanism of FIG. 1.

As shown in FIGS. 5 and 6, drag mechanism 50 may produce a vertical and/or lateral drag force on a piece of material 18 as it is urged by pusher 38 toward processing device 34. Drag mechanism 50 may be located adjacent to, such as mounted above, processing path 20 between input end 14 and processing device 34. The drag force may result from friction between a portion of drag mechanism 50 and material 18, friction between fence 40 and material 18 as drag mechanism 50 urges material 18 against the fence, or a combination thereof.

The drag mechanism may be configured to contact material 18 in an orientation that is nonparallel to the processing axis. Drag mechanism 50 may be configured to urge material 18 against a fence structure 40, which is mounted parallel to the processing axis. The drag mechanism may be adjustable about an axis that is substantially perpendicular to the processing axis, thereby allowing adjustability of the amount of force that is applied to material 18 to urge it towards fence structure 40.

FIG. 5 shows a top view of an exemplary drag mechanism 50. The drag mechanism may include a rotatable portion or wheel 66 that is configured to rotate in a direction that is nonparallel to processing axis 22. As illustrated in FIG. 5, the wheel rotates in a direction that forms an angle alpha ($\alpha$) with the processing axis, the angle alpha being adjustable to alter the amount of drag force exerted on a piece of material being transported toward the processing device.

Drag wheel 66 may be positioned on top of material 18 as it slides against fence 40 along processing path 20. Since the drag wheel may be angled towards the fence, wheel 66 may urge material 18 against fence 40 as the material is urged along the processing path, thereby further restricting undesired movement of material 18. Such an orientation also assists in maintaining the position of material 18 along processing path 20.

Friction between wheel 66 and material 18 may also be affected by how freely wheel 66 is allowed to rotate about a wheel axis 68. Consequently, tension in rotation of the wheel may alternatively, or additionally, be adjustable.

As more clearly shown in the side view of FIG. 6, wheel 66 may be coupled to processing station 32 via mounting structure 70. Mounting structure 70 may include a support arm 72 that is pivotally coupled at one end to the processing station and at the opposing end to the wheel. Bracket 74 may secure drag wheel 66 to arm 72 and may be configured to allow adjustment of the orientation of wheel 66 relative to the processing axis 22, illustrated by angle alpha in FIG. 5. As shown, the angle may be increased or decreased by rotating drag wheel 66 about drag adjustment axis 76 to obtain a corresponding increase or decrease of drag on material 18.

Support arm 72 may be pivotally mounted to processing station 32 by frame 78 so that arm 72 rotates about vertical adjustment axis 80 and suspends wheel 66 above the processing path. Consequently, wheel 66 may be configured to translate vertically relative to the material to accommodate different thicknesses of material 18 and variations along the piece of material, such as through warpage, as material 18 is urged along the processing path.

The embodiment shown in FIGS. 5 and 6 is intended as an illustrative example. Drag mechanism 50 may include more than one rotating component or wheel. For example, the drag mechanism may include a set of rollers that may be adjustable about drag adjustment axis 76 either as a group or independently. In some configurations, the portion of drag mechanism 50 that contacts material 18 may not be rotatable and instead may include a contoured surface, the orientation of which may determine the force applied to material 18.

The specific embodiments disclosed and illustrated herein should not be considered as limiting the scope of the invention. Numerous variations are possible without falling outside the scope of the appended claims. For example, the invention may be implemented in numerous different machine configurations with varying levels of automation. The invention may also be used to process many different kinds of materials including, but not limited to, wood, wood composites, polymeric materials such as PVC, polystyrene, polypropylene, polyethylene, fiberglass, textiles, etc. In addition to cutting, the invention may be used to carry out other processing steps such as boring, punching, routing, mortising, sanding, drilling, shearing, bonding, sewing, heating, UV curing, painting or graphics application, etc. The subject matter of the invention includes all novel and nonobvious combinations and subcombinations of the various elements, features, functions, and/or properties disclosed herein.

We claim:

1. A material handling system for maneuvering material through a processing station, the system comprising
- a processing path bounded by an input end and an output end and defining a processing axis,
- a pusher mechanism configured to urge a piece of material along the processing path,
- a controller configured to optimize processing of a piece of material to satisfy a cut list,
- a processing device including a saw positioned along the processing path, and a drag mechanism mounted above the processing path between the input end and the saw, the drag mechanism being configured to produce a drag force on the piece of material being urged by the pusher toward the processing device, the drag mechanism including a wheel.

2. The system of claim 1, wherein the drag mechanism is configured to contact the piece of material in an orientation that is nonparallel to the processing axis.

3. The system of claim 1, wherein the wheel rotates in a direction that forms an angle alpha with the processing axis, the angle alpha being adjustable to alter the amount of drag force exerted on the piece of material being transported toward the processing device.

4. The system of claim 3, further comprising a fence structure mounted parallel to the processing axis, wherein the wheel is configured to urge the piece of material against the fence structure.

5. The system of claim 1, wherein tension in rotation of the wheel is adjustable.

6. The system of claim 1, wherein the drag mechanism includes a support arm that allows a portion of the drag mechanism to move vertically relative to the piece of material to accommodate variations in thickness of the piece of material being urged along the processing path.

7. The system of claim 6, wherein the support arm rotates relative to a mounting structure and supports a wheel.

8. A processing system for maneuvering material through a processing device, the system comprising a processing path bounded by an input end and an output end and defining a processing axis, a pusher configured to urge a piece of material from the input end towards the output end, a processing device including a saw positioned along the processing path, a controller configured to optimize processing of a piece of material to satisfy a cut list, and a drag mechanism located adjacent the processing path between the input end and the saw and oriented non-parallel to the processing axis, the drag mechanism being configured to apply a force to the piece of material as the piece of material is urged by the pusher toward the processing device, the drag mechanism including a wheel.

9. The system of claim 8, wherein the drag mechanism is adjustable about a drag adjustment axis that is substantially perpendicular to the processing axis.

10. The system of claim 9, wherein a portion of the drag mechanism rotates in a direction that forms an angle with the processing axis, the drag mechanism being configured such that a decrease in the angle produces an increase in the force applied to the piece of material.

11. The system of claim 8, wherein the wheel is configured to rotate about a wheel axis and having adjustable tension about the wheel axis.

12. The system of claim 8, wherein a portion of the drag mechanism is configured to translate in a direction that is substantially perpendicular to the processing axis.

13. The system of claim 8, wherein the drag mechanism is suspended above the processing path and configured to apply a force vertically and laterally against the piece of material.

14. A processing system for maneuvering material through a processing device, the system comprising a linear processing path bounded by an input end and an output end and defining a processing axis, a pusher configured to urge a piece of material along a portion of the processing path, a fence configured to index the piece of material along a portion of the processing path, a processing device including a saw positioned between the input end and the output end, a controller configured to optimize processing of the piece of material to satisfy a cut list, and a drag mechanism located adjacent the processing path between the input end and the saw and oriented non-parallel to the processing axis, the drag mechanism being configured to apply a force to the piece of material and urge the piece of material against the fence, the drag mechanism including a wheel.

15. The system of claim 14, wherein the drag mechanism includes a rotatable portion that rotates in a direction that forms an angle alpha with the processing axis and contacts the piece of material, the angle alpha being adjustable to alter the amount of force exerted against the piece of material towards the fence.

16. The system of claim 15, wherein the drag mechanism includes a support arm that permits the rotatable portion to translate perpendicularly to the direction of rotation to accommodate variations in thickness of the piece of material.

17. The system of claim 16, wherein the support arm suspends the rotatable portion above the processing path.

18. The system of claim 14, wherein the drag mechanism includes a wheel is configured to rotate about a wheel axis and having adjustable tension about the wheel axis.

19. The system of claim 18, wherein the drag mechanism is configured to support the wheel above the processing path and permit vertical and lateral translation of the wheel relative to the processing path.

* * * * *